(12) United States Patent
Hayashi et al.

(10) Patent No.: US 9,640,835 B2
(45) Date of Patent: May 2, 2017

(54) ION CONDUCTING GLASS-CERAMICS, METHOD FOR MANUFACTURING SAME AND ALL-SOLID-STATE SECONDARY BATTERY INCLUDING SAME

(71) Applicant: JAPAN SCIENCE AND TECHNOLOGY AGENCY, Kawaguchi-shi (JP)

(72) Inventors: Akitoshi Hayashi, Osaka (JP); Masahiro Tatsumisago, Osaka (JP)

(73) Assignee: JAPAN SCIENCE AND TECHNOLOGY AGENCY, Saitama (JP)

( * ) Notice: Subject to any disclaimer, the term of this patent is extended or adjusted under 35 U.S.C. 154(b) by 190 days.

(21) Appl. No.: 14/382,202

(22) PCT Filed: Feb. 20, 2013

(86) PCT No.: PCT/JP2013/054159
§ 371 (c)(1),
(2) Date: Aug. 29, 2014

(87) PCT Pub. No.: WO2013/133020
PCT Pub. Date: Sep. 12, 2013

(65) Prior Publication Data
US 2015/0030938 A1 Jan. 29, 2015

(30) Foreign Application Priority Data
Mar. 6, 2012 (JP) ................................ 2012-049189

(51) Int. Cl.
H01M 10/0562 (2010.01)
C03B 19/00 (2006.01)
(Continued)

(52) U.S. Cl.
CPC ......... H01M 10/0562 (2013.01); C03B 19/00 (2013.01); C03B 32/02 (2013.01);
(Continued)

(58) Field of Classification Search
CPC ........... H01M 10/0562; H01M 10/054; H01M 2300/0068; H01M 2220/20; H01M 2220/10
See application file for complete search history.

(56) References Cited

U.S. PATENT DOCUMENTS

| 4,542,108 | A | 9/1985 | Susman et al. |
| 2010/0040952 | A1* | 2/2010 | Kimura ................... H01M 4/58 429/245 |
| 2014/0154585 | A1 | 6/2014 | Hayashi et al. |

FOREIGN PATENT DOCUMENTS

| JP | H11-134937 A | 5/1999 |
| JP | 2012-121789 A | 6/2012 |
| WO | 2013/015321 A1 | 1/2013 |

OTHER PUBLICATIONS

Yao,"Structure and properties of glasses in the MI + M2S + (0.1Ga2S3 + 0.9GeS2), M = Li, Na, K and Cs, system", Journal of Non-Crystalline Solids 354 (Feb. 2008) 2045-2053.*
(Continued)

Primary Examiner — Devina Pillay
(74) Attorney, Agent, or Firm — Stites & Harbison, PLLC; Terry L. Wright; Jeffrey A. Haeberlin

(57) ABSTRACT

An ion conducting glass-ceramics represented by the general formula (I): $Na_2S-M_xS_y-N_aS_b$, wherein M and N are different and selected from P, Si, Ge, B, Al and Ga; x, y, a and b are integers indicating the stoichiometric ratio depending on the species of M and N; and the content of $Na_2S$ is more than 60 mol % and less than 80 mol %.

10 Claims, 5 Drawing Sheets

(51) Int. Cl.
- H01G 11/56 (2013.01)
- H01M 10/054 (2010.01)
- C03B 32/02 (2006.01)
- H01B 1/10 (2006.01)

(52) U.S. Cl.
CPC .......... *H01G 11/56* (2013.01); *H01M 10/054* (2013.01); *H01B 1/10* (2013.01); *H01M 2220/10* (2013.01); *H01M 2220/20* (2013.01); *H01M 2300/0068* (2013.01); *Y02E 60/13* (2013.01); *Y02T 10/7022* (2013.01)

(56) References Cited

OTHER PUBLICATIONS

M. Tatsumisago, et al., "All-Solid-State Lithium Secondary Batteries Using Sulfide-Based Glass Ceramic Electrolytes," Functional Materials Letters, 2008, vol. 1, No. 1, pp. 31-36.

A. Hayashi, et al., "Kagayaki Hajimeta 32 Seiki no Mirai Zairyo, Development of solid electrolytes with sodium ion conductivity for application to all-solid-state batteries," Materials Integration, Jan. 20, 2012, vol. 25, No. 01, pp. 17-21.

K. Noi, et al., "Mechanochemical synthesis and Ion conductivity of the Na2S-P2S5 solid electrolytes," The 24th Fall Meeting of the Ceramic Society of Japan Koen Yokoshu, Sep. 7, 2011, p. 239.

K. Noi, et al., "Preparation and Characterization of Sodium Ion Conducting Na2S-P2S5 Glass-ceramic Solid Electrolytes," Abstracts of the 78th Annual Meeting of the Electrochemical Society of Japan, Mar. 29, 2011, p. 52.

JPO, International Search Report issued in corresponding international application No. PCT/JP2013/054159, mailed May 14, 2013.

\* cited by examiner

Only the peaks for deposition and dissolution of Na

ION CONDUCTING GLASS-CERAMICS, METHOD FOR MANUFACTURING SAME AND ALL-SOLID-STATE SECONDARY BATTERY INCLUDING SAME

TECHNICAL FIELD

The present invention relates to an ion conducting glass-ceramics, a method for manufacturing the same and an all-solid-state secondary battery including the same. More specifically, the present invention relates to an ion conducting glass-ceramics that can be provided at low cost because of abundant sodium resources, a method for manufacturing the same and an all-solid-state secondary battery including the same.

BACKGROUND ART

Lithium secondary batteries have high voltage and high capacity, and thus have been widely used as power supplies of mobile phones, digital cameras, camcorders, notebook computers, electric vehicles and the like. A lithium secondary battery generally distributed contains an electrolyte which is a liquid electrolyte containing an electrolyte salt dissolved in a non-aqueous solvent. As non-aqueous solvents include a number of flammable solvents, there is a need for assuring safety.

For the purpose of assuring safety, an all-solid-state secondary battery has been proposed that contains a so-called solid electrolyte formed from a solid material, $Li_2S$—$P_2S_5$, devoid of a non-aqueous solvent (Non-Patent Document 1).

PRIOR ART DOCUMENT

Non-Patent Document

Non-Patent Document 1: M. Tatsumisago et. al., Funct. Mater. Lett., 1 (2008) 31

SUMMARY OF THE INVENTION

Problems that the Invention is to Solve

Recently, there is an increased demand for lithium secondary batteries for storing electric power in automobiles such as electric vehicles and hybrid vehicles and power-generating facilities such as solar cells and wind power generators. However, lithium secondary batteries have concerns about shortage of supply because the batteries utilize lithium which has limited reserves and uneven distribution. In addition, the lithium secondary batteries also have problems of high cost.

Means for Solving the Problems

The present inventors are of the opinion that the above-mentioned concerns and problems may also apply to all-solid-state secondary batteries. Accordingly batteries utilizing sodium which has abundant resources may be contemplated as secondary batteries for the next generation after lithium secondary batteries. Batteries utilizing sodium contain a sodium ion conducting solid, a widely known example of which includes β-alumina. The material exhibits sodium ion conductivity of $10^{-3}$ S cm$^{-1}$ or more at room temperature [reference: X. Lu et al., Journal of Power Sources, 195 (2010) 2431-2442]. However, the material has problems in that the synthesis thereof requires sintering at a high temperature of 1600° C. or more and that the material has low contact-ability at a solid-solid interface with an electrode active material. It is crucial to obtain a material having high conductivity in the form of molded powder obtained only by pressing without requiring sintering at a high temperature, in order to construct an electrode-electrolyte interface in all-solid-state batteries functioning at room temperature. The inventors examined existing publications without successfully finding the reference on a solid material having sufficient sodium ion conductivity as molded powder at room temperature.

The present inventors thus sought to use $Na_2S$ instead of $Li_2S$. However, the inventors felt that there was still room for improvement in terms of ion conductivity. As a result of further exhaustive studies, the present inventors have found that a glass-ceramics obtained by subjecting solid starting materials including $Na_2S$ to mechanical milling treatment to obtain a glass which is then subjected to heat treatment at a temperature at or above the glass transition temperature of the glass has significantly improved ion conductivity, thereby achieving the present invention.

Thus the present invention provides an ion conducting glass-ceramics represented by the general formula (I): $Na_2S$-$M_xS_y$—$N_aS_b$, wherein M and N are different and selected from P, Si, Ge, B, Al and Ga; x, y, a and b are integers indicating the stoichiometric ratio depending on the species of M and N; and the content of $Na_2S$ is more than 60 mol % and less than 80 mol %.

The present invention further provides a method for manufacturing the ion conducting glass-ceramics, including the steps of:

subjecting a starting material mixture containing $Na_2S$, $M_xS_y$ and $N_aS_b$ at a predetermined proportion that provides the general formula (I): $Na_2S$-$M_xS_y$—$N_aS_b$ to mechanical milling treatment to obtain a glass; and subjecting the glass to heat treatment at a temperature at or above the crystallization temperature thereof to convert the glass to the ion conducting glass-ceramics.

The present invention also provides an all-solid-state secondary battery containing at least a positive electrode, a negative electrode and a solid electrolyte layer between the positive electrode and the negative electrode, wherein the solid electrolyte layer contains the ion conducting glass-ceramics.

Effect of the Invention

According to the present invention, glass-ceramics which have high ion conductivity and are independent of the quantity of lithium reserves can be provided.

When $Na_2S$-$M_xS_y$—$N_aS_b$ is $Na_2S$—$P_2S_5$—$SiS_2$, the glass-ceramics having further increased ion conductivity can be provided.

According to the method for manufacturing the glass-ceramics of the present invention, glass-ceramics which have high ion conductivity and are independent of the quantity of lithium reserves can be provided by simple procedures as mechanical milling treatment and heat treatment.

When the mechanical milling treatment is carried out with a planetary ball mill under the conditions of 50 to 600 rpm, 0.1 to 50 hours and 1 to 100 kWh/kg of the starting material mixture, the glass-ceramics having further increased ion conductivity can be provided.

The all-solid-state secondary battery of the present invention contains a solid electrolyte layer containing sodium, and thus can be provided at low cost because of abundant sodium resources.

Figure 1:
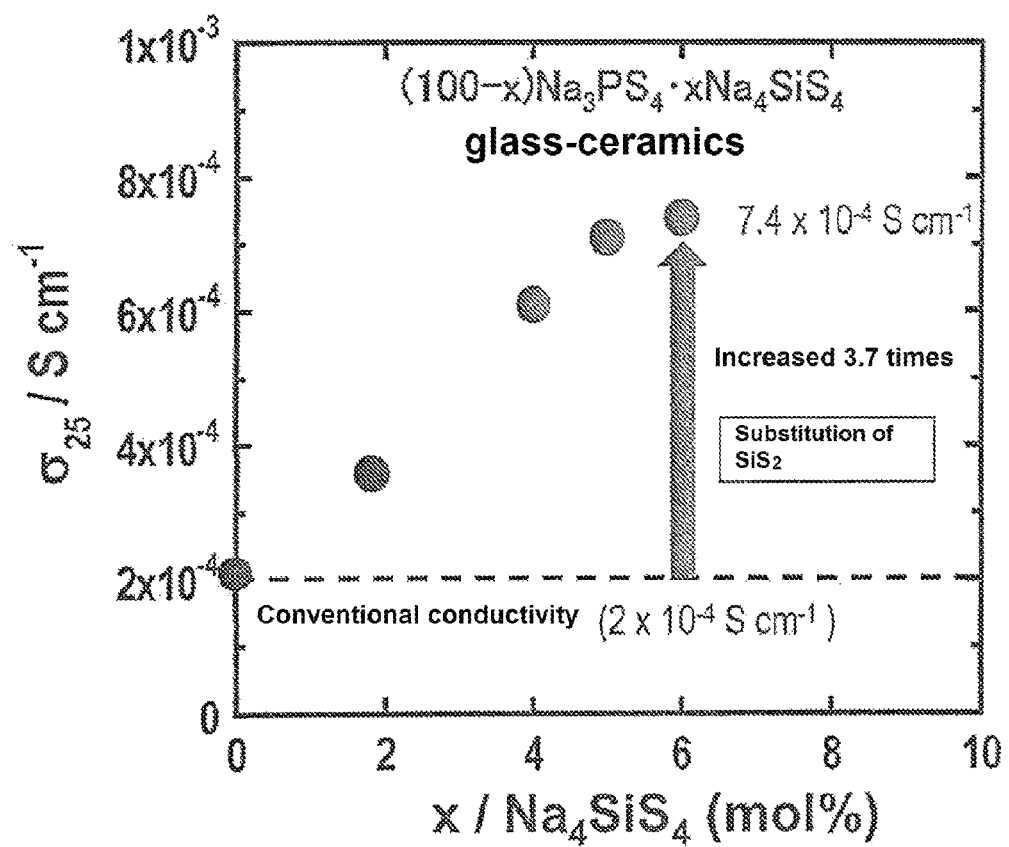
FIG. 1 is a graph showing the conductivity at room temperature of the glass-ceramics of Example 1.

MODE FOR CARRYING OUT THE INVENTION (Ion Conducting Glass-Ceramics)

The glass-ceramics may have crystalline portions dispersed in amorphous glass components. The proportion of the crystalline portions is preferably, relative to the whole glass-ceramics, 50% by weight or more and more preferably 80% by weight or more. The upper limit of the proportion is 100% by weight. The proportion of the crystalline portions can be determined on solid-state NMR.

The glass-ceramics is preferably the one that does not have the glass transition temperature of the corresponding glass.

The ion conducting glass-ceramics of the present invention is represented by the general formula (I): $Na_2S$-$M_xS_y$—$N_aS_b$, wherein M and N are different and selected from P, Si, Ge, B, Al and Ga; x, y, a and b are integers indicating the stoichiometric ratio depending on the species of M and N; and the content of $Na_2S$ is more than 60 mol % and less than 80 mol %. Specifically, $Na_2S$—$P_2S_5$—$SiS_2$, $Na_2S$—$P_2S_5$—$GeS_2$, $Na_2S$—$P_2S_5$—$B_2S_3$, $Na_2S$—$P_2S_5$—$Al_2S_3$, $Na_2S$—$P_2S_5$—$Ga_2S_3$, $Na_2S$—$SiS_2$—$GeS_2$, $Na_2S$—$SiS_2$—$B_2S_3$, $Na_2S$—$SiS_2$—$Al_2S_3$, $Na_2S$—$SiS_2$—$Ga_2S_3$, $Na_2S$—$GeS_2$—$B_2S_3$, $Na_2S$—$GeS_2$—$Al_2S_3$, $Na_2S$—$GeS_2$—$Ga_2S_3$, $Na_2S$—$B_2S_3$—$Al_2S_3$, $Na_2S$—$B_2S_3$—$Ga_2S_3$, $Na_2S$—$Al_2S_3$—$Ga_2S_3$ and the like may be mentioned. Among these, $Na_2S$—$P_2S_5$—$SiS_2$ is particularly preferred. The glass-ceramics may further contain an additional ion conductive material such as NaI and $Na_3PO_4$.

The present inventors believe that the ion conducting material of the present invention contains 3 components and therefore can provide glass and glass-ceramics containing a higher amount of Na ions than the material containing 2 components such as $Na_2S$—$P_2S_5$.

Furthermore, the $Na_2S$-$M_xS_y$—$N_aS_b$ contains more than 60 mol % and less than 80 mol % of $Na_2S$. When the amount of $Na_2S$ is within this range, the material can have improved ion conductivity compared to the corresponding glass. The content of $Na_2S$ is more preferably more than 65 mol % and less than 80 mol % and further preferably 67 to 78 mol %.

When $M_xS_y$ represents $P_2S_5$, the content of $N_aS_b$ is preferably in the range such that the crystal structure of $Na_2S$—$P_2S_5$ can be maintained. In the case of $Na_2S$—$P_2S_5$—$SiS_2$, the proportion of $SiS_2$ in $Na_2S$—$P_2S_5$—$SiS_2$ is preferably in the range of 0.1 to 10 mol %. When the proportion is in this range, $Na_2S$—$P_2S_5$—$SiS_2$ can have significantly improved conductivity compared to that of $Na_2S$—$P_2S_5$, resulting in provision of an all-solid-state secondary battery having an improved charge and discharge efficiency. The proportion of $SiS_2$ is more preferably in the range of 4 to 8 mol %.

(Method for Manufacturing Ion Conducting Glass-Ceramics)

The method for manufacturing the ion conducting glass-ceramics includes the steps of:

(i) subjecting a starting material mixture containing $Na_2S$, $M_xS_y$ and $N_aS_b$ at a predetermined proportion that provides the general formula (I): $Na_2S$-$M_xS_y$—$N_aS_b$ to mechanical milling treatment to obtain a glass; and (ii) subjecting the glass to heat treatment at a temperature at or above the crystallization temperature thereof to convert the glass to the ion conducting glass-ceramics.

(1) Step (i)

The mechanical milling treatment in the step (i) is not particularly limited as to the treatment instrument and treatment conditions as far as the starting materials are sufficiently mixed and allowed to react.

The treatment instrument used may usually be a ball mill. Ball mills are preferred because they can provide high mechanical energy. Among ball mills, a planetary ball mill is preferred because it can efficiently generate high impact energy due to rotation of a pot as well as revolution of a stage.

The treatment conditions may be appropriately selected according to the treatment instrument used. When a ball mill is used for example, the starting materials may be further uniformly mixed and allowed to react when the rotation speed is increased and/or the treatment period is extended. The term "and/or" in the context of "A and/or B" means "A", "B" or "A and B". Specifically, when a planetary ball mill is used, the conditions may be the rotation speed of 50 to 600 rpm, the treatment period of 0.1 to 50 hours and 1 to 100 kWh/kg of the starting material mixture. More preferred treatment conditions may be the rotation speed of 200 to 500 rpm, the treatment period of 1 to 20 hours and 6 to 50 kWh/kg of the starting material mixture.

(2) Step (ii)

The glass obtained in the step (i) is subjected to heat treatment to convert the glass to the ion conducting glass-ceramics. The heat treatment is carried out at a temperature at or above the crystallization temperature of the glass.

The glass transition temperature ($T_g$) varies depending on the proportion between $Na_2S$, $M_xS_y$ and $N_aS_b$. For example, $Na_2S$—$P_2S_5$ has the glass transition temperature in the range of 180 to 200° C. and the first crystallization temperature ($T_c$) in the range of 190 to 240° C. The upper limit of the temperature during heat treatment is not particularly limited and generally is the first crystallization temperature+100° C.

The heat treatment period is the period during which the glass may be converted to the ion conducting glass-ceramics. The heat treatment temperature is high with a shortened heat treatment period and is low with a lengthened heat treatment period. The heat treatment period is generally in the range of 0.1 to 10 hours.

(Application of Ion Conducting Glass-Ceramics)

The ion conducting glass-ceramics may have any applications for which ion conductivity is required. For example, solid electrolyte layers for all-solid-state secondary batteries and all-solid-state capacitors, conductive layers for sensors and the like may be mentioned. Among these, the ion conducting glass-ceramics is preferably used as a solid electrolyte layer for all-solid-state secondary batteries.

The all-solid-state secondary battery generally includes, but is not particularly limited to, at least a positive electrode, a negative electrode and a solid electrolyte layer between the positive electrode and the negative electrode.

(1) Solid Electrolyte Layer

The solid electrolyte layer contains the ion conducting glass-ceramics ($Na_2S-M_xS_y—N_aS_b$). The solid electrolyte layer may further contain, in addition to the ion conducting glass-ceramics, an electrolyte (e.g., NaI or $Na_3PO_4$) that is usually contained in all-solid-state secondary batteries. The solid electrolyte layer preferably contains the ion conducting glass-ceramics at a proportion of 80% by weight or more and more preferably the ion conducting glass-ceramics accounts for the whole amount of the solid electrolyte layer. The solid electrolyte layer preferably has a thickness of 1 to 1000 μm and more preferably 1 to 200 μm. The solid electrolyte layer may be obtained, for example, in the form of pellets by pressing the starting materials thereof.

(2) Positive Electrode

The positive electrode is not particularly limited. The positive electrode may contain only a positive electrode active material or may further contain a binder, a conductive agent, an electrolyte and the like mixed with the positive electrode active material.

The positive electrode active material may include various transition metal compounds such as $Na_{0.44}MnO_2$, $NaNi_{0.5}Mn_{0.5}O_2$, $FeS$, $TiS_2$, $NaCoO_2$, $NaFeO_2$, $NaCrO_2$, $Na_3V_2(PO_4)_3$ and $NaMn_2O_4$, sulfur, sodium sulfide, sodium polysulfide and the like.

The binder may include, for example, polyvinylidene fluoride, polytetrafluoroethylene, polyvinyl alcohol, polyvinyl acetate, poly(methyl methacrylate), polyethylene and the like.

The conductive agent may include natural graphite, artificial graphite, acetylene black, ketjen black, Denka black, carbon black, vapor grown carbon fibers (VGCFs) and the like.

The electrolyte may include those used for solid electrolyte layers.

The positive electrode can be obtained, for example, in the form of pellets by mixing the positive electrode active material and an optional binder, conductive agent, electrolyte and the like and pressing the obtained mixture.

The positive electrode may be formed on a current collector such as aluminum or copper.

(3) Negative Electrode

The negative electrode is not particularly limited. The negative electrode may contain only a negative electrode active material or may further contain a binder, a conductive agent, an electrolyte and the like mixed with the negative electrode active material.

The negative electrode active material may include metals such as Na, In and Sn, Na alloys, graphite, hard carbon and various transition metal oxides such as $Li_{4/3}Ti_{5/3}O_4$, $Na_3V(PO_4)_3$ and SnO.

The binder, conductive agent and electrolyte may be those mentioned above in the section of the positive electrode.

The negative electrode can be obtained, for example, in the form of pellets by mixing the negative electrode active material and an optional binder, conductive agent, electrolyte and the like and pressing the obtained mixture. The negative electrode active material that is a metal sheet (foil) of a metal or an alloy thereof can be used as it is.

The negative electrode may be formed on a current collector such as aluminum or copper.

(4) Method for Producing All-Solid-State Secondary Battery

The all-solid-state secondary battery can be obtained, for example, by stacking and pressing the positive electrode, the electrolyte layer and the negative electrode.

EXAMPLES

The present invention is hereinafter further specifically illustrated by way of Examples which do not limit the present invention.

Example 1

Step (i): Mechanical Milling Treatment $Na_2S$ (Nagao Co., Ltd; purity: 99.1%), $P_2S_5$ (Aldrich; purity: 99.9%) and $SiS_2$ (Fruuchi Chemical Corporation; purity: 99.999%) were weighed at the mole percentages so that $(100-x)Na_3PS_4.xNa_4SiS_4$ with x=0, 2, 4, 5 and 6 was obtained and respectively charged in a planetary ball mill. The materials were then subjected to mechanical milling treatment to obtain mixtures respectively having the compositions of $Na_3PS_4$ ($75Na_2S.25P_2S_5$), $98Na_3PS_4.2Na_4SiS_4$, $96Na_3PS_4.4Na_4SiS_4$, $95Na_3PS_4.5Na_4SiS_4$ and $94Na_3PS_4.6Na_4SiS_4$.

The planetary ball mill used was Pulverisette P-7 from Fritsch and the mill included a pot of 45 ml containing 500 balls each having a diameter of 4 mm with the pot and balls being made of $ZrO_2$. The mechanical milling treatment was carried out at a rotation speed of 510 rpm at room temperature for 20 hours in a dry nitrogen-filled glove box.

The method as described above follows the descriptions in Experimental in Akitoshi Hayashi et al., Journal of Non-Crystalline Solids 356 (2010) 2670-2673.

The five different samples (80 mg each) after the mechanical milling treatment as described above were pressed (pressure: 370 MPa) to obtain pellets each having a diameter of 10 mm and a thickness of about 1 mm. It was confirmed by DTA that the obtained pellets partly contained cubic $Na_3PS_4$ due to the reaction by milling and also contained glass components.

Step (ii): Heat Treatment

The five different pellets containing glasses as above were heated from room temperature (25° C.) towards 220° C. that is at or above the crystallization temperature in order to convert the glasses to glass-ceramics. After reaching to 220° C., the pellets of glass-ceramics were cooled towards room temperature.

The results of conductivity measurements of pellets of glass-ceramics at room temperature are shown in FIG. 1. As shown in FIG. 1, it is found that the pellets of the $Na_3PS_4$ glass-ceramics had the conductivity of $2 \times 10^{-4}$ $Scm^{-1}$ while all pellets of glass-ceramics containing the $SiS_2$ components had an increased conductivity. It is also found that the glass-ceramics of $94Na_3PS_4.6Na_4SiS_4$ had the conductivity ($7.4 \times 10^{-4}$ $Scm^{-1}$) that was about 3.7 times higher than that of the $Na_3PS_4$ glass-ceramics.

Example 2

Figure 2:
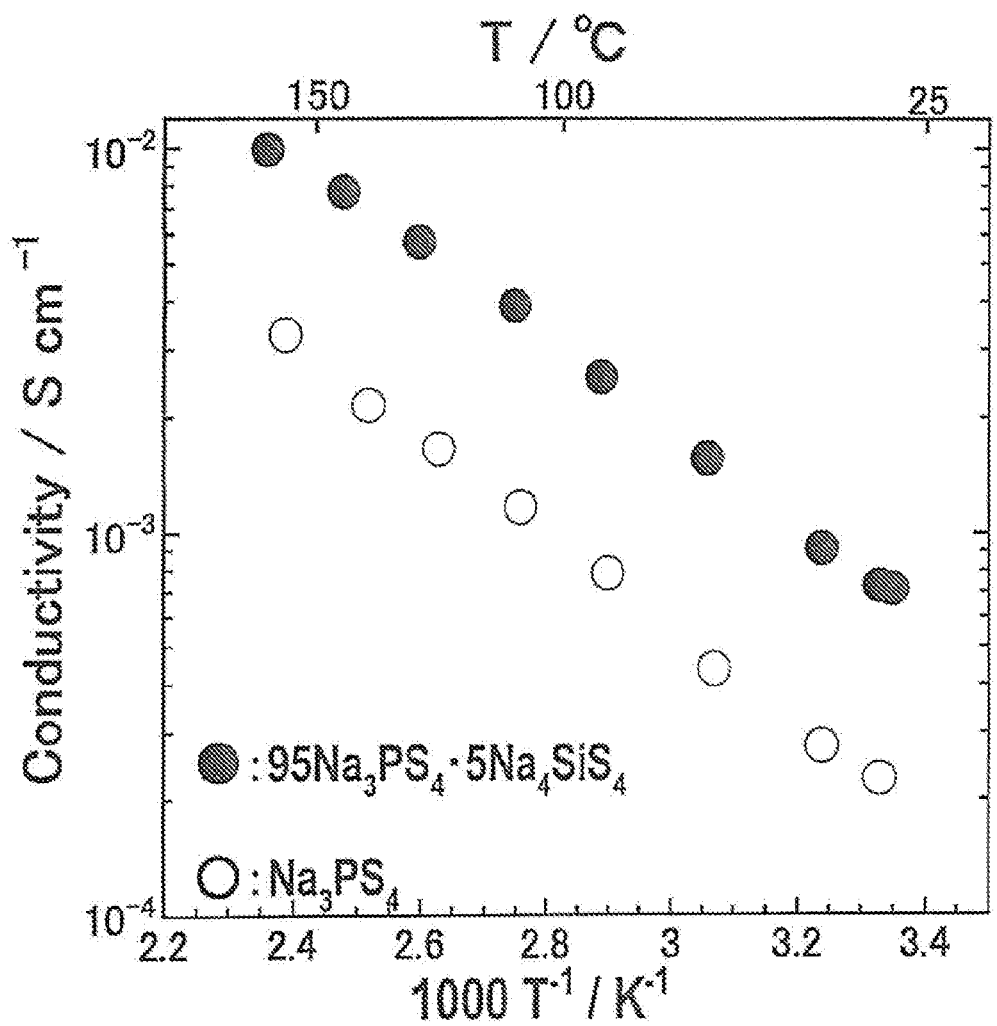
FIG. 2 is a graph showing the temperature dependency of the conductivity for the glass-ceramics of Example 2.

The change in the conductivity of the pellets of the $Na_3PS_4$ glass-ceramics and of the $95Na_3PS_4.5Na_4SiS_4$ glass-ceramics as a function of the temperature of the pellets is shown in FIG. 2. In FIG. 2, the filled circles represent the measurement result for the pellets of the $95Na_3PS_4.5Na_4SiS_4$ glass-ceramics and the open circles represent the measurement result for the $Na_3PS_4$ glass-ceramics. The glass-ceramics were treated at 270° C.

FIG. 2 indicates the following.

It is found that the pellets of the $95Na_3PS_4.5Na_4SiS_4$ glass-ceramics have a higher conductivity than the pellets of the $Na_3PS_4$ glass-ceramics at any temperature in the range of 25 to 160° C.

Example 3

In the same manner as Example 1, pellets of $Na_3PS_4$ ($75Na_2S \cdot 25P_2S_5$), $95Na_3PS_4 \cdot 5Na_4SiS_4$, $90Na_3PS_4 \cdot 10Na_4SiS_4$, $75Na_3PS_4 \cdot 25Na_4SiS_4$, $33Na_3PS_4 \cdot 67Na_4SiS_4$ and $Na_4SiS_4$ ($67Na_2S \cdot 33SiS_2$) glass-ceramics were obtained. Due to the variation in the crystallization temperature according to the compositions, the samples were subjected to heat treatment at a temperature selected between 220 to 360° C. according to the crystallization temperature.

Figure 3:
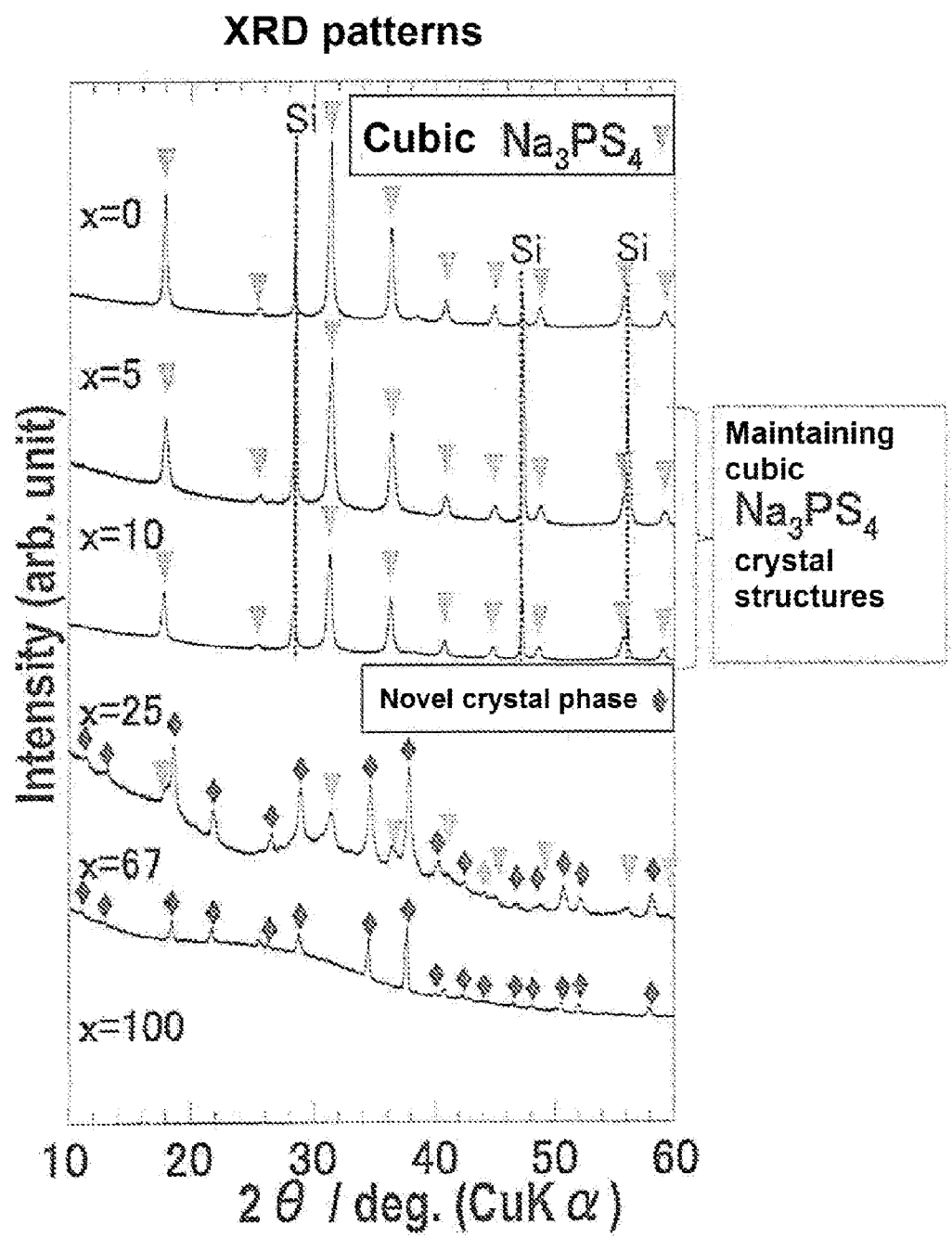
FIG. 3 shows XRD patterns for the glass-ceramics of Example 3.

The XRD patterns for the pellets of the obtained glass-ceramics are shown in FIG. 3. From FIG. 3, it is found that the pellets of $95Na_3PS_4 \cdot 5Na_4SiS_4$ and $90Na_3PS_4 \cdot 10Na_4SiS_4$ glass-ceramics have the same cubic $Na_3PS_4$ crystal structure as $Na_3PS_4$.

Figure 4:
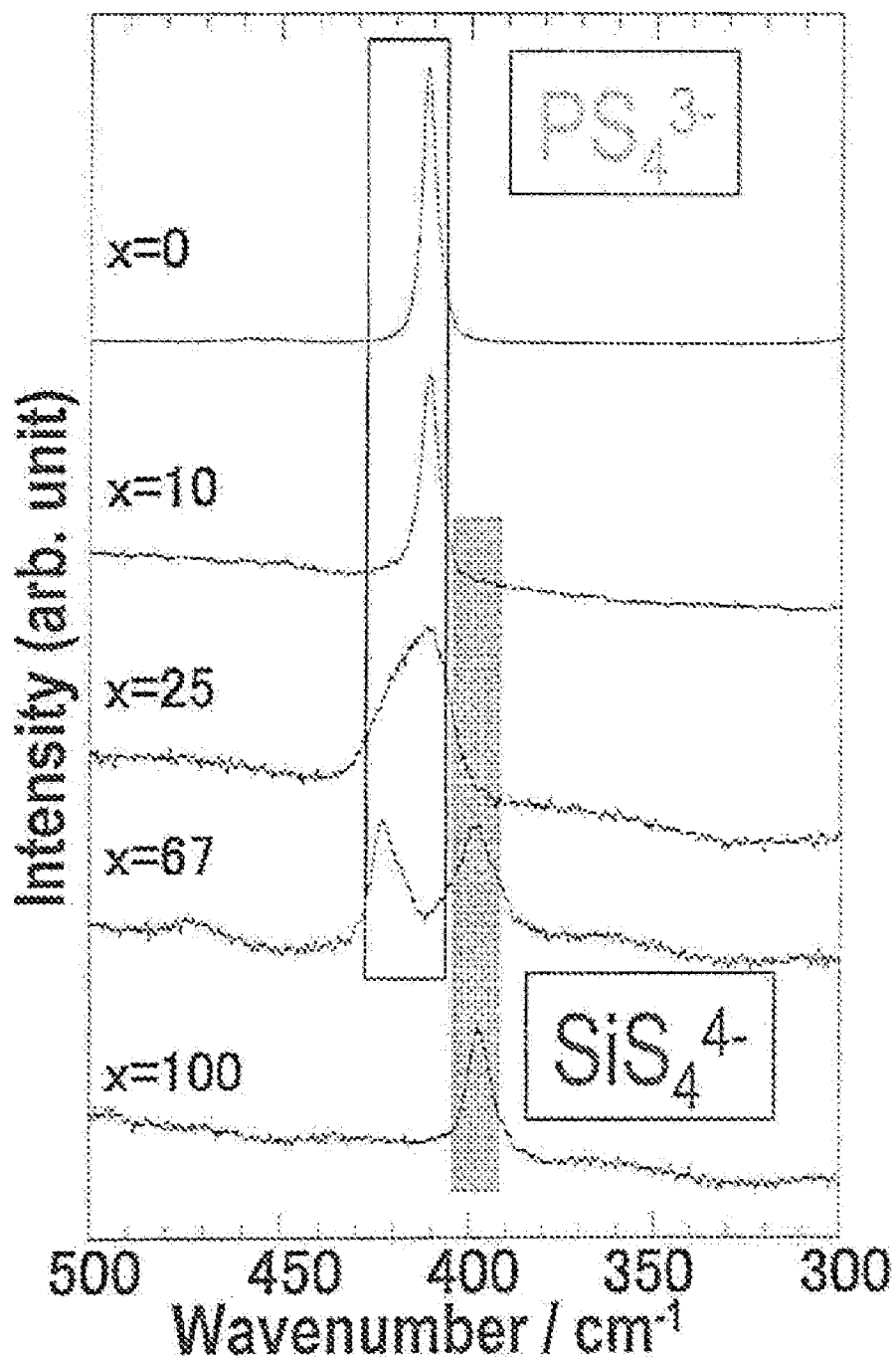
FIG. 4 shows Raman spectra for the glass-ceramics of Example 3.

The Raman spectra for the pellets of $Na_3PS_4$ ($75Na_2S \cdot 25P_2S_5$), $90Na_3PS_4 \cdot 10Na_4SiS_4$, $75Na_3PS_4 \cdot 25Na_4SiS_4$, $33Na_3PS_4 \cdot 67Na_4SiS_4$ and $Na_4SiS_4$ ($67Na_2S \cdot 33SiS_2$) glass-ceramics are shown in FIG. 4. From FIG. 4, it is found that the glass-ceramics contain discrete anions of $PS_4^{3-}$ and $SiS_4^{4-}$ without bridging sulfurs and have local structures depending on the loaded compositions of $(100-x)Na_3PS_4 \cdot xNa_4SiS_4$. With the pellets of the $90Na_3PS_4 \cdot 10Na_4SiS_4$ glass-ceramics, the peak of $PS_4^{3-}$ derived from $Na_3PS_4$ was mainly observed, which result does not conflict with the experimental result from XRD showing that cubic $Na_3PS_4$ was present.

Example 4

Figure 5:
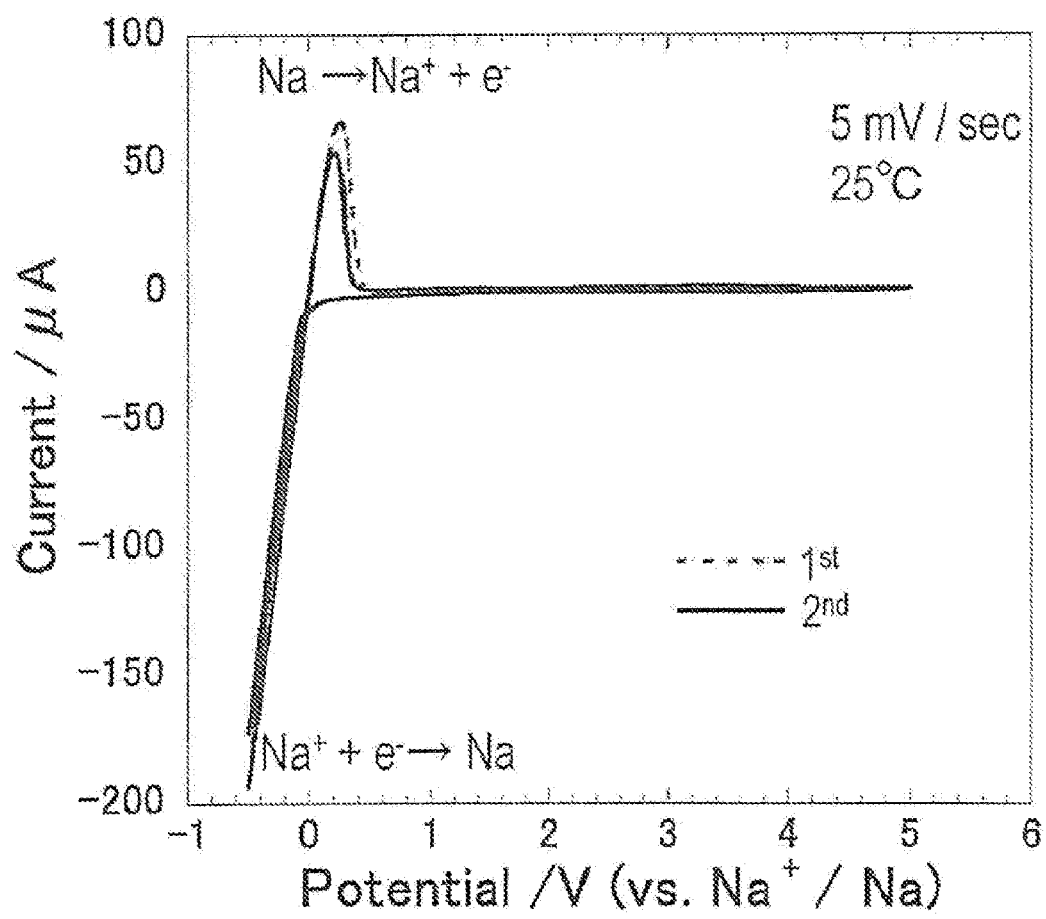
FIG. 5 shows a cyclic voltammogram for the glass-ceramics of Example 4.

FIG. 5 shows a cyclic voltammogram which was obtained by cyclic voltammetry with a working electrode of stainless steel, an electrolyte of pellets (thickness: about 1 mm) of the $90Na_3PS_4 \cdot 10Na_4SiS_4$ glass-ceramics and a counter electrode of metal sodium on stainless steel. The sweeping condition was 5 mV/sec at room temperature.

It is found from FIG. 5 that with the glass-ceramics, reduction/oxidation current corresponding to dissolution and deposition of Na was repeatedly observed at around 0 V. In addition, because sweeping towards the oxidation side up to +5 V did not result in observation of high oxidation current due to decomposition of the electrolyte or the like, it is found that the glass-ceramics is electrochemically stable up to +5 V.

The invention claimed is:

1. An ion conducting glass-ceramics represented by a general formula (I): $Na_2S-M_xS_y-N_aS_b$, wherein the $Na_2S-M_xS_y-N_aS_b$ is $Na_2S-P_2S_5-SiS_2$; and a content of $Na_2S$ is more than 60 mol % and less than 80 mol %.

2. The ion conducting glass-ceramics according to claim 1, wherein the $Na_2S-P_2S_5-SiS_2$ contains 0.1 to 10 mol % of $SiS_2$.

3. The ion conducting glass-ceramics according to claim 1, which does not have a glass transition temperature of a corresponding glass having the same general formula as the ion conducting glass ceramics.

4. The ion conducting glass-ceramics according to claim 1, wherein the ion conducting glass-ceramics comprises crystalline portions dispersed in amorphous glass components.

5. The ion conducting glass-ceramics according to claim 4, wherein the crystalline portions have a cubic $Na_3PS_4$ crystal structure.

6. An ion conducting glass-ceramics represented by a general formula (I): $Na_2S-M_xS_y-N_aS_b$, wherein M and N are different and selected from P, Si, Ge, B, Al and Ga; x, y, a and b are integers indicating a stoichiometric ratio depending on the species of M and N; and a content of $Na_2S$ is more than 60 mol % and less than 80 mol %, wherein the ion conducting glass-ceramics comprises crystalline portions dispersed in amorphous glass components, and wherein the crystalline portions have a cubic $Na_3PS_4$ crystal structure.

7. The ion conducting glass-ceramics according to claim 6, wherein the $Na_2S-M_xS_y-N_aS_b$ is $Na_2S-P_2S_5-SiS_2$, $Na_2S-P_2S_5-GeS_2$, $Na_2S-P_2S_5-B_2S_3$, $Na_2S-P_2S_5-Al_2S_3$, $Na_2S-P_2S_5-Ga_2S_3$, $Na_2S-SiS_2-GeS_2$, $Na_2S-SiS_2-B_2S_3$, $Na_2S-SiS_2-Al_2S_3$, $Na_2S-SiS_2-Ga_2S_3$, $Na_2S-GeS_2-B_2S_3$, $Na_2S-GeS_2-Al_2S_3$, $Na_2S-GeS_2-Ga_2S_3$, $Na_2S-B_2S_3-Al_2S_3$, $Na_2S-B_2S_3-Ga_2S_3$ or $Na_2S-Al_2S_3-Ga_2S_3$.

8. A method for manufacturing the ion conducting glass-ceramics according to claim 6, comprising the steps of:

subjecting a starting material mixture containing $Na_2S$, $M_xS_y$ and $N_aS_b$ at a predetermined proportion that provides the general formula (I): $Na_2S-M_xS_y-N_aS_b$ to mechanical milling treatment to obtain a glass; and subjecting the glass to heat treatment at a temperature at or above the crystallization temperature thereof to convert the glass to the ion conducting glass-ceramics.

9. The method for manufacturing the ion conducting glass-ceramics according to claim 8, wherein the mechanical milling treatment is carried out with a planetary ball mill under conditions of 50 to 600 rpm, 0.1 to 50 hours and 1 to 100 kWh/kg of the starting material mixture.

10. An all-solid-state secondary battery comprising at least a positive electrode, a negative electrode and a solid electrolyte layer between the positive electrode and the negative electrode, wherein the solid electrolyte layer comprises the ion conducting glass-ceramics according to claim 6.

* * * * *